US012631825B2

(12) United States Patent
Kurino

(10) Patent No.: US 12,631,825 B2
(45) Date of Patent: May 19, 2026

(54) OPTICAL FIBER CUTTER

(71) Applicant: SUMITOMO ELECTRIC OPTIFRONTIER CO., LTD., Kanagawa (JP)

(72) Inventor: Shinsuke Kurino, Yokohama (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 163 days.

(21) Appl. No.: 18/575,047

(22) PCT Filed: Jun. 27, 2022

(86) PCT No.: PCT/JP2022/025568
§ 371 (c)(1),
(2) Date: Dec. 28, 2023

(87) PCT Pub. No.: WO2023/276952
PCT Pub. Date: Jan. 5, 2023

(65) Prior Publication Data
US 2024/0319442 A1 Sep. 26, 2024

(30) Foreign Application Priority Data
Jul. 2, 2021 (JP) ................................. 2021-110748

(51) Int. Cl.
*G02B 6/25* (2006.01)

(52) U.S. Cl.
CPC ..................................... *G02B 6/25* (2013.01)

(58) Field of Classification Search
CPC G02B 6/25; B26F 3/002; C03B 37/16; B26D 7/02; B26D 7/08; B26D 3/16
See application file for complete search history.

(56) References Cited

U.S. PATENT DOCUMENTS

| | | | |
|---|---|---|---|
| 4,445,632 A | 5/1984 | Margolin et al. | |
| 10,261,258 B1 | 4/2019 | Zhao | |

(Continued)

FOREIGN PATENT DOCUMENTS

| | | | | |
|---|---|---|---|---|
| CN | 104330849 A | * | 2/2015 | ............... G02B 6/25 |
| EP | 3859414 A1 | | 8/2021 | |

(Continued)

OTHER PUBLICATIONS

English language translation of CN 104330849 to Zhang (Year: 2015).*

(Continued)

*Primary Examiner* — Evan H Macfarlane
(74) *Attorney, Agent, or Firm* — McDonald Hopkins LLC

(57) ABSTRACT

An optical fiber cutter includes a main body including a fiber fixing portion, and a moving portion including a blade for scratching the optical fiber, the moving portion being attached to the main body to be movable between a first position and a second position, the first position being an initial position before the optical fiber is scratched, the second position being a position after the optical fiber is scratched. The fiber fixing portion is configured to move the optical fiber such that the optical fiber fixed to the fiber fixing portion does not cross a movement range when the blade portion moves from the second position to the first position, and such that a cleaved surface of the optical fiber after cleaving is positioned in a direction away from the blade portion along an axial direction of the optical fiber.

3 Claims, 12 Drawing Sheets

(56) References Cited

U.S. PATENT DOCUMENTS

| | | | |
|---|---|---|---|
| 2003/0077062 A1 | 4/2003 | Sasaki et al. | |
| 2015/0323740 A1 | 11/2015 | Zhao | |
| 2019/0339453 A1 | 11/2019 | Matsuda et al. | |
| 2022/0043213 A1 | 2/2022 | Kurino | |

FOREIGN PATENT DOCUMENTS

| | | | |
|---|---|---|---|
| GB | 1524808 A | 9/1978 | |
| GB | 1584029 A | 2/1981 | |
| JP | S61-232404 A | 10/1986 | |
| JP | H07-080798 A | 3/1995 | |
| JP | 2003-202425 A | 7/2003 | |
| JP | 2014-238574 A | 12/2014 | |
| WO | 2020066407 A1 | 4/2020 | |

OTHER PUBLICATIONS

Merriam Webster dictionary, definition of 'on', obtained from https://www.merriam-webster.com/dictionary/on on Nov. 19, 2025.*
International Search Report dated Jul. 26, 2022 issued in PCT/JP2022/025568.
Written Opinion dated Jul. 26, 2022 issued in PCT/JP2022/025568.

* cited by examiner

OPTICAL FIBER CUTTER

TECHNICAL FIELD

The present disclosure relates to an optical fiber cutter.

The present application claims priority from Japanese Patent Application No. 2021-110748 filed on Jul. 2, 2021, the entire contents of which are incorporated herein by reference.

BACKGROUND ART

Patent Literatures 1 and 2 disclose, as an optical fiber cleaving apparatus, an apparatus in which a slider having a blade portion is manually moved from an initial position to a cleaved position where the optical fiber can be cleaved after the optical fiber is positioned, and the slider is manually returned to the initial position after the optical fiber is cleaved. Particularly, Patent Literatures 1 and 2 disclose the optical fiber cleaving apparatus that automatically moves a slider using a magnetic force.

CITATION LIST

Patent Literature

Patent Literature 1: US2015/0323740
Patent Literature 2: U.S. Ser. No. 10/261,258B

SUMMARY OF INVENTION

Technical Problem

An optical fiber cutter according to an aspect of the present disclosure is an optical fiber cutter for cleaving an optical fiber, the optical fiber cutter including:
  a main body including a fiber fixing portion configured to change a position of the optical fiber; and
  a moving portion including a blade for scratching the optical fiber, the moving portion being attached to the main body to be movable between a first position and a second position, the first position being an initial position before the optical fiber is scratched, the second position being a position after the optical fiber is scratched,
  in which the fiber fixing portion is configured to move the optical fiber such that the optical fiber fixed to the fiber fixing portion does not cross a movement range when the blade portion moves from the second position to the first position, and such that a cleaved surface of the optical fiber after cleaving is positioned in a direction away from the blade portion along an axial direction of the optical fiber.

DESCRIPTION OF EMBODIMENTS

Figure 1:
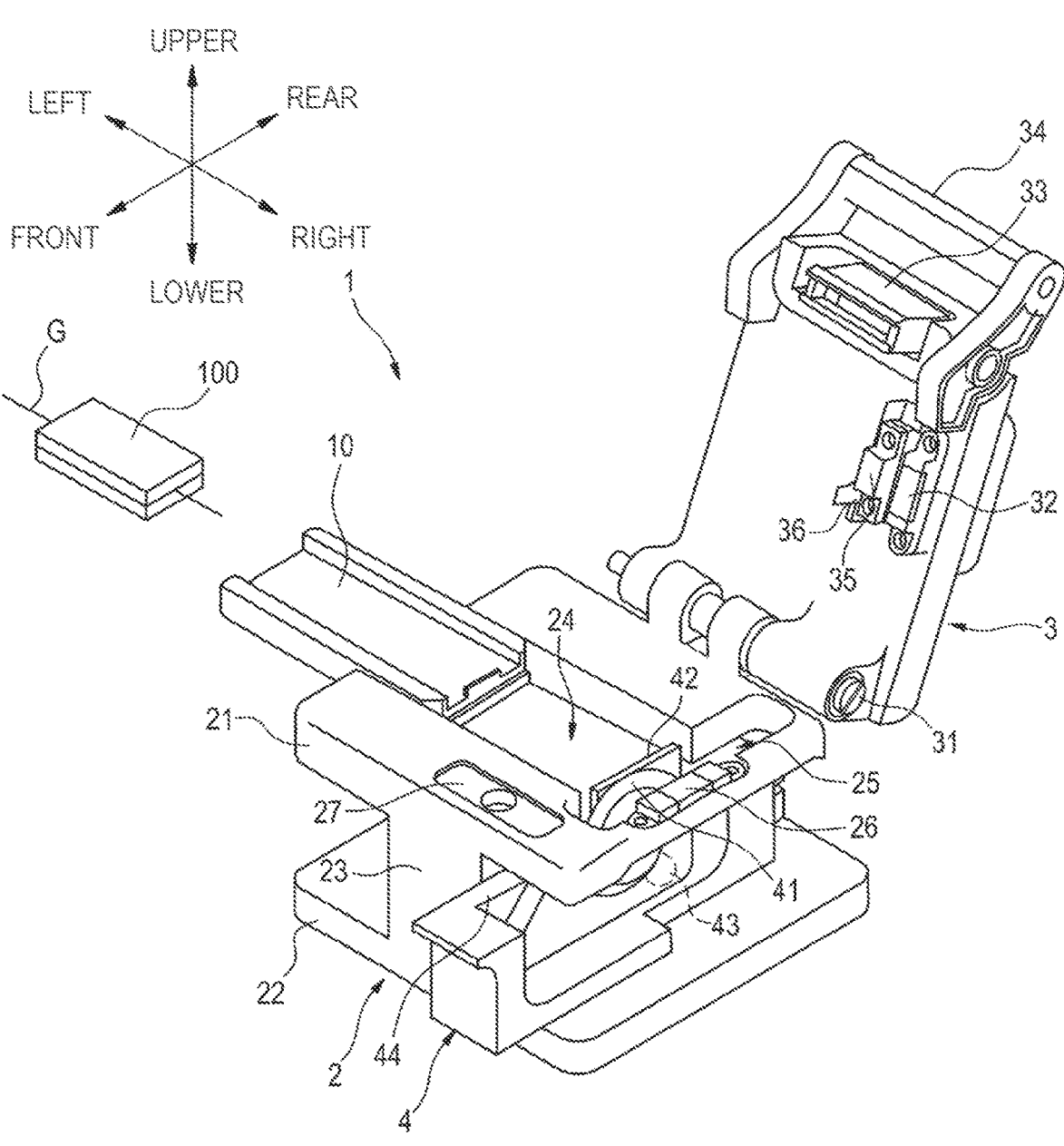
FIG. 1 is a perspective view illustrating a state in which a lid body of an optical fiber cutter according to the present embodiment is opened.

Problem to be Solved by Present Disclosure

In order to improve workability at the time of cleaving an optical fiber, it is desirable to automatically return the slider to the vicinity of the initial position after cleaving the optical fiber, as in the optical fiber cleaving apparatuses of Patent Literatures 1 and 2. However, when the slider is returned to the initial position, there is a possibility that the blade portion comes into contact with the cleaved optical fiber and an unintended portion of the optical fiber is scratched or the optical fiber is cleaved again.

In view of the above, an object of the present disclosure is to provide an optical fiber cutter capable of preventing a blade portion from unintentionally coming into contact with and scratching an optical fiber after the optical fiber is cleaved.

Description of Embodiment of Present Disclosure

First, an embodiment of the present disclosure will be listed and described.

An optical fiber cutter according to an aspect of the present disclosure is (1) an optical fiber cutter for cleaving an optical fiber, the optical fiber cutter including:
  a main body including a fiber fixing portion configured to change a position of the optical fiber; and
  a moving portion including a blade for scratching the optical fiber, the moving portion being attached to the main body to be movable between a first position and a second position, the first position being an initial position before the optical fiber is scratched, the second position being a position after the optical fiber is scratched,
  in which the fiber fixing portion is configured to move the optical fiber such that the optical fiber fixed to the fiber fixing portion does not cross a movement range when the blade portion moves from the second position to the first position, and such that a cleaved surface of the optical fiber after cleaving is positioned in a direction away from the blade portion along an axial direction of the optical fiber.

According to this configuration, it is possible to provide the optical fiber cutter capable of preventing the blade portion from unintentionally coming into contact with and scratching the optical fiber after the optical fiber is cleaved.

(2) In the above (1), the optical fiber cutter further includes a first biasing member configured to bias the fiber fixing portion toward the blade portion side, when the moving portion moves from the first position to the second position, the fiber fixing portion is biased by the first biasing member to be positioned on the blade portion side, and when the moving portion moves from the second position to the first position, the fiber fixing portion moves in a direction away from the blade portion against a biasing force of the first biasing member.

According to this configuration, by changing the position of the fiber fixing portion with a simple configuration, it is possible to prevent the blade portion from unintentionally coming into contact with and scratching the optical fiber after the optical fiber is cleaved.

(3) In the above (2), the moving portion includes: a rotatable cam; and a second biasing member configured to bias the cam such that the cam rotates in a direction in which the cam protrudes toward the fiber fixing portion side, and when the moving portion moves from the first position to the second position, the cam rotates in a direction in which the cam does not protrude toward the fiber fixing portion side against a biasing force of the second biasing member, and the moving portion moves from the second position to the first position, the cam protrudes toward the fiber fixing portion side by being biased by the second biasing member.

According to this configuration, when the moving portion moves between the first position and the second position, the position of the fiber fixing portion can be changed by the cam mounted on the moving portion at an appropriate timing.

(4) In the above (3), the cam is rotatable in a first direction and in a second direction opposite to the first direction, and a range of rotation of the cam in the second direction is limited, when the moving portion moves from the first position to the second position, the cam rotates in the first direction not to inhibit the first biasing member from biasing the fiber fixing portion toward the blade portion side, when the moving portion reaches the second position, the cam is not in contact with the fiber fixing portion, and the cam receives the biasing force of the second biasing member and rotates in the second direction in which the cam protrudes toward the fiber fixing portion side, and when the moving portion moves from the second position to the first position, the cam presses the fiber fixing portion by limiting the range of the rotation of the cam in the second direction and maintaining protruding of the cam toward the fiber fixing portion side, and the fiber fixing portion moves in the direction away from the blade portion against the biasing force of the first biasing member.

According to this configuration, by limiting the range of rotation of the cam in a predetermined direction (second direction), when the moving portion moves from the second position to the first position, the fiber fixing portion can be reliably retreated.

(5) In the above (4), the cam and the second biasing member are mounted in a concave portion formed in the moving portion, and when the moving portion moves from the second position to the first position, the cam comes into contact with an inner wall surface of the concave portion, and the rotation of the cam in the second direction is limited.

According to this configuration, the configuration in which the range of rotation of the cam in the predetermined direction (second direction) is limited and the optical fiber is retracted together with the fiber fixing portion by the protrusion of the cam can be realized with a simple and small number of components.

Effects of Present Disclosure

According to the present invention, it is possible to provide the optical fiber cutter capable of preventing the blade portion from unintentionally coming into contact with and scratching the optical fiber after the optical fiber is cleaved.

Details of Embodiment of Present Disclosure

A specific example of an optical fiber cutter according to an embodiment of the present disclosure will be described below with reference to the drawings. It should be noted that the present disclosure is not limited to the following examples, but is indicated by claims, and is intended to include all changes within the meaning and scope equivalent to the claims. In addition, front, rear, left, right, upper, and lower directions illustrated in the drawings are directions used for convenience of description, and do not limit the present disclosure.

Figure 2:
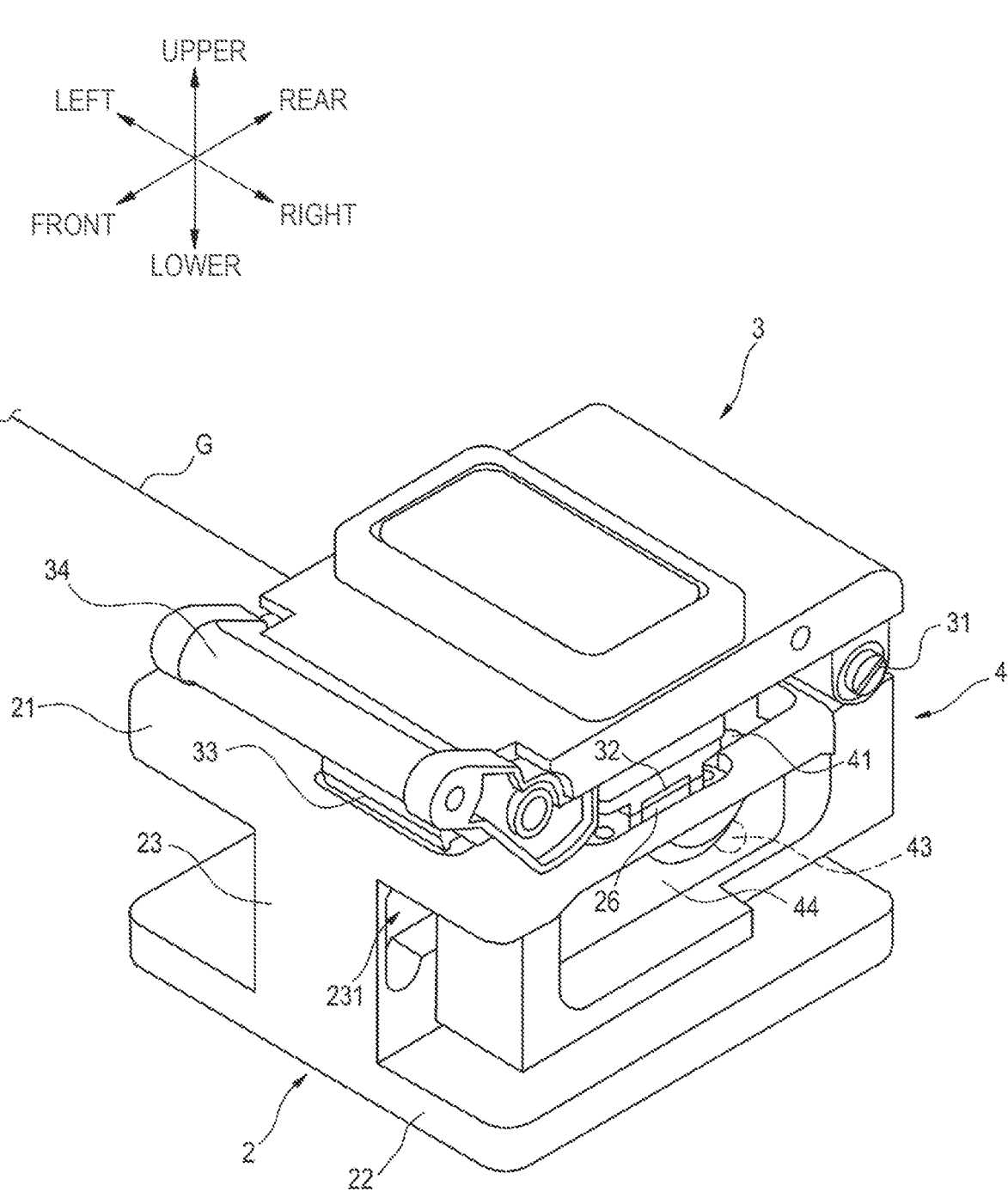
FIG. 2 is a perspective view illustrating a state after the lid body of the optical fiber cutter illustrated in FIG. 1 is closed and an optical fiber is cleaved.
Figure 3:
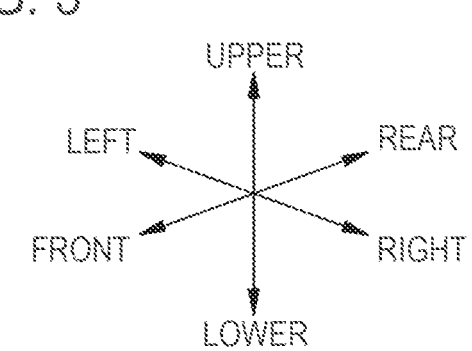
FIG. 3 is a perspective view illustrating a main body of the optical fiber cutter.
Figure 3:
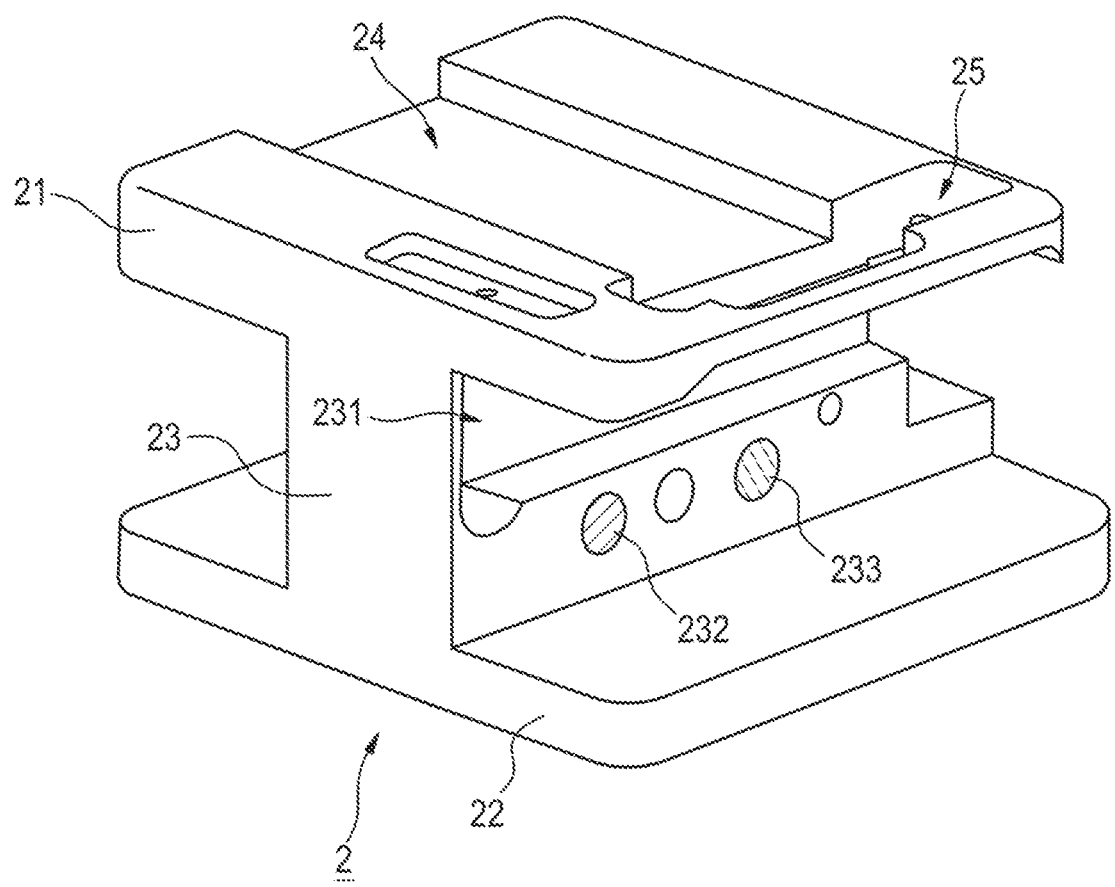

FIG. 1 is a perspective view illustrating a state in which a lid body 3 of an optical fiber cutter 1 according to the present embodiment is opened. FIG. 2 is a perspective view illustrating a state after the lid body 3 of the optical fiber cutter 1 illustrated in FIG. 1 is closed and an optical fiber G is cleaved. FIG. 3 is a perspective view illustrating a main body 2 of the optical fiber cutter 1 illustrated in FIG. 1.

As illustrated in FIGS. 1 to 3, the optical fiber cutter 1 is an apparatus for cleaving the optical fiber G. The optical fiber cutter 1 includes the main body 2, the lid body 3 configured to fix the optical fiber G, and a moving portion 4 that is movable with respect to the main body 2.

The main body 2 includes a top plate portion 21, a bottom plate portion 22 disposed below the top plate portion 21, and a connection portion 23 connecting the top plate portion 21 and the bottom plate portion 22. The main body 2 is formed to have a substantially I-shaped cross section by the top plate portion 21, the bottom plate portion 22, and the connection portion 23. The main body 2 is made of, for example, metal or resin other than ferromagnetic material.

The top plate portion 21 includes a guide concave portion 24, an exposure hole 25, a lower clamp portion 26, and a catcher 27. The guide concave portion 24 is a concave portion provided on an upper surface of the top plate portion 21. A fiber fixing portion 10 configured to hold the optical fiber G to be cleaved is mounted in the guide concave portion 24. The guide concave portion 24 is formed in a concave shape corresponding to a shape of the fiber fixing portion 10 to be mounted, and is formed in a concave shape slightly larger than an outer shape of the fiber fixing portion 10 such that the fiber fixing portion 10 can slide in the guide concave portion 24.

An optical fiber holder 100 holding the optical fiber G is mounted to the fiber fixing portion 10. A concave portion corresponding to a shape of the optical fiber holder 100 to be mounted is formed in the fiber fixing portion 10. The optical fiber holder 100 holds optical fibers or optical fiber ribbons in a parallel state. The fiber fixing portion 10 is configured to be mounted in the guide concave portion 24 to set a cleaved position of the optical fiber G held by the optical fiber holder 100. In addition, the fiber fixing portion 10 is configured to slide in the guide concave portion 24 along a left-right direction in FIG. 1 to change a position of the optical fiber G held by the optical fiber holder 100.

The exposure hole 25 is a long hole from which a blade portion 41 (to be described later) attached to the moving portion 4 protrudes. The exposure hole 25 is provided to extend in a direction (front-rear direction in FIG. 1) orthogonal to an axial direction (left-right direction in FIG. 1) of the optical fiber G positioned by the fiber fixing portion 10.

The lower clamp portion 26 is a member for fixing the optical fiber G. The lower clamp portion 26 is provided on a side opposite, with respect to the exposure hole 25, to a side on which the fiber fixing portion 10 is mounted.

The catcher 27 is a member for attracting the lid body 3. The catcher 27 is provided on the upper surface of the top plate portion 21 at a position corresponding to a magnet 33 (to be described later) provided on the lid body 3.

The connection portion 23 includes a guide portion 231, a metal member 232, and a first magnet 233. The guide portion 231 is provided to extend along a moving direction (front-rear direction) of the moving portion 4. The guide portion 231 is, for example, a groove having a substantially U-shaped cross section, and is configured to guide movement of the moving portion 4.

The metal member 232 and the first magnet 233 are provided side by side in the moving direction of the moving portion 4. The metal member 232 and the first magnet 233 are provided at positions where the metal member 232 and the first magnet 233 face a second magnet 43 (to be described later) provided in the moving portion 4. In the moving direction of the moving portion 4, the metal member 232 is disposed on a front side, and the first magnet 233 is disposed on a rear side. The metal member 232 is a magnetic metal and has a property of attracting the second magnet 43. The metal member 232 is formed of, for example, a ferromagnetic material such as iron, nickel, cobalt, and an alloy containing the same. The first magnet 233 generates a repulsive force between the first magnet 233 and the second magnet 43, when the first magnet 233 and the second magnet 43 face each other.

The lid body 3 is a plate-like body attached to a rear end of an upper surface of the main body 2 via a support shaft 31 to be openable and closable. The lid body 3 includes an upper clamp portion 32, a spring (not illustrated) mounted to the support shaft 31, the magnet 33 for holding the lid body 3 in a closed state, and a handle 34 for releasing the closed state of the lid body 3.

The upper clamp portion 32 is provided on a back surface (surface facing the main body 2) of the lid body 3. The upper clamp portion 32 is provided to face the lower clamp portion 26 provided on the upper surface of the main body 2, when the lid body 3 is closed. When the lid body 3 is closed with respect to the main body 2, the optical fiber G is sandwiched between the upper clamp portion 32 and the lower clamp portion 26.

The spring mounted to the support shaft 31 presses the lid body 3 in an opening direction. The magnet 33 is disposed on a side edge of the lid body 3 opposite to the support shaft 31. When the lid body 3 is closed with respect to the main body 2, the magnet 33 is attracted to the catcher 27 of the main body 2 against a pressing force of the spring provided on the support shaft 31. Accordingly, the closed state of the lid body 3 with respect to the main body 2 is maintained. When the handle 34 is pulled upward in the closed state, a force for opening upward is applied to the lid body 3, and the attraction between the magnet 33 and the catcher 27 is opened (released). By opening the attraction between the magnet 33 and the catcher 27, the lid body 3 is automatically opened by a repulsive force of the spring mounted to the support shaft 31.

The lid body 3 further includes, on the back surface of the lid body 3, a breaking member 35 configured to bend the optical fiber G and an engaging piece 36 fixed to the breaking member 35. The breaking member 35 is mounted to the lid body 3 in a state where a compression spring (not illustrated) is attached between the back surface of the lid body 3 and the breaking member 35. The breaking member 35 is disposed in parallel with the upper clamp portion 32. The engaging piece 36 is, for example, a protruding piece formed of a flexible member. The engaging piece 36 is fixed to the breaking member 35 in an elastically deformable state.

The breaking member 35 receives a repulsive force of the compression spring, and is normally held in a state (posture) in which the breaking member 35 protrudes vertically in a direction away from the back surface of the lid body 3. The breaking member 35 is configured to apply pressure to the optical fiber G by being in a protruding state. In addition, the breaking member 35 is pressed in a direction approaching the back surface of the lid body 3 against a biasing force of the compression spring, and is held in a non-protruding state, due to the engaging piece 36 being pressed and pushed in. The breaking member 35 is configured not to apply pressure to the optical fiber G by being in the non-protruding state.

Between the top plate portion 21 and the bottom plate portion 22, the moving portion 4 is attached to the main body 2 to be movable between a first position (position illustrated in FIG. 1) and a second position (position illustrated in FIG. 2). The first position is an initial position of the moving portion 4 in which the moving portion 4 has moved in a forward direction. The second position is a movement position of the moving portion 4 in which the moving portion 4 has moved in a rearward direction. The moving portion 4 may be configured to linearly move between the first position and the second position, or may be configured to move along a trajectory including a curve. Alternatively, the moving portion 4 may be configured such that both the movement are possible.

For example, a guide block (not illustrated) having a ball slide (not illustrated) is provided on a side surface, of the moving portion 4, on the connection portion 23 side. The guide block is slidably supported by the guide portion 231 of the connection portion 23 via the ball slide, and enables the moving portion 4 to move in the front-rear direction. In the present embodiment, the moving portion 4 is configured to be movable only in the rearward direction from the first position, and to be movable only in the forward direction from the second position.

The moving portion 4 includes a blade portion 41 configured to scratch the optical fiber G, a protrusion 42 configured to apply pressure to the engaging piece 36 of the lid body 3, and the second magnet 43 configured to automatically move the moving portion 4 in the forward direction.

The blade portion 41 is attached such that a part of the blade portion 41 protrudes above the exposure hole 25 of the main body 2. The blade portion 41 is provided to move with the movement of the moving portion 4 and to be able to initially scratch the optical fiber G while the moving portion 4 moves from the first position to the second position. A shape of the blade portion 41 is not particularly limited, but a rounded blade is used in the present embodiment. The blade portion 41 may be configured to move linearly in accordance with the movement of the moving portion 4, may be configured to move along a trajectory drawing a gentle arc when viewed from a side surface, or may be configured such that both the movement are possible.

While the moving portion 4 is moved from the first position to the second position in a state where the lid body 3 is closed, the protrusion 42 abuts against the engaging piece 36 of the lid body 3 and pushes the engaging piece 36 upward. As the engaging piece 36 is pushed in by the protrusion 42, the breaking member 35 is also pushed, and the breaking member 35 is held in the non-protruding state. In addition, when the moving portion 4 further moves and reaches the second position, the protrusion 42 passes through the engaging piece 36, and the breaking member 35 leaves the state against the biasing force of the compression spring. As a result, the breaking member 35 is lowered by the biasing force of the compression spring to protrude, and comes into contact with a glass fiber portion of the optical fiber G to apply pressure. Therefore, while the moving portion 4 moves from the first position to the second position, the optical fiber G is cleaved starting from the initial scratch of the glass fiber portion.

In a state where the protrusion 42 passes through the engaging piece 36 and the moving portion 4 reaches the second position, the engaging piece 36 engages with the protrusion 42 and restricts the moving portion 4 from moving in the forward direction. When the lid body 3 is opened, the engagement between the protrusion 42 and the engaging piece 36 is released, and the moving portion 4 becomes movable to the first position.

The second magnet 43 is provided on a side wall 44, of the moving portion 4, facing the guide portion 231 of the connection portion 23 of the main body 2, when the moving portion 4 is attached to the main body 2. The second magnet 43 is provided on a wall surface of the side wall 44 of the moving portion 4 opposite to a wall surface on a side on which the blade portion 41 is provided. For example, the second magnet 43 is provided to face the metal member 232 provided in the connection portion 23, when the moving portion 4 has moved to the first position, and to face the first magnet 233 provided in the connection portion 23, when the moving portion 4 has moved to the second position. The moving portion 4 is configured to automatically move (return) to the first position by the repulsive force generated between the second magnet 43 and the first magnet 233 and by an attraction force generated between the second magnet 43 and the metal member 232.

In the present embodiment, the metal member 232, the first magnet 233, and the second magnet 43 are used to automatically move the moving portion 4 in the forward direction, but the present disclosure is not limited to this, and for example, a biasing member such as a spring may be used. When the lid body 3 is opened and the engagement between the protrusion 42 and the engaging piece 36 is released, the moving portion 4 may be automatically moved to the first position by the biasing force of the biasing member.

Next, the fiber fixing portion 10 mounted in the guide concave portion 24 and the moving portion 4 moving along the main body 2 will be further described with reference to FIGS. 4 to 8.

Figure 4:
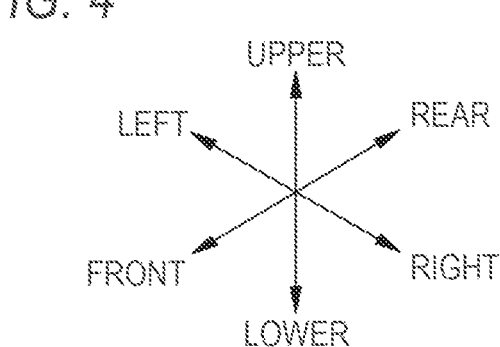
FIG. 4 is a view illustrating a positional relationship between a fiber fixing portion and a moving portion.
Figure 4:
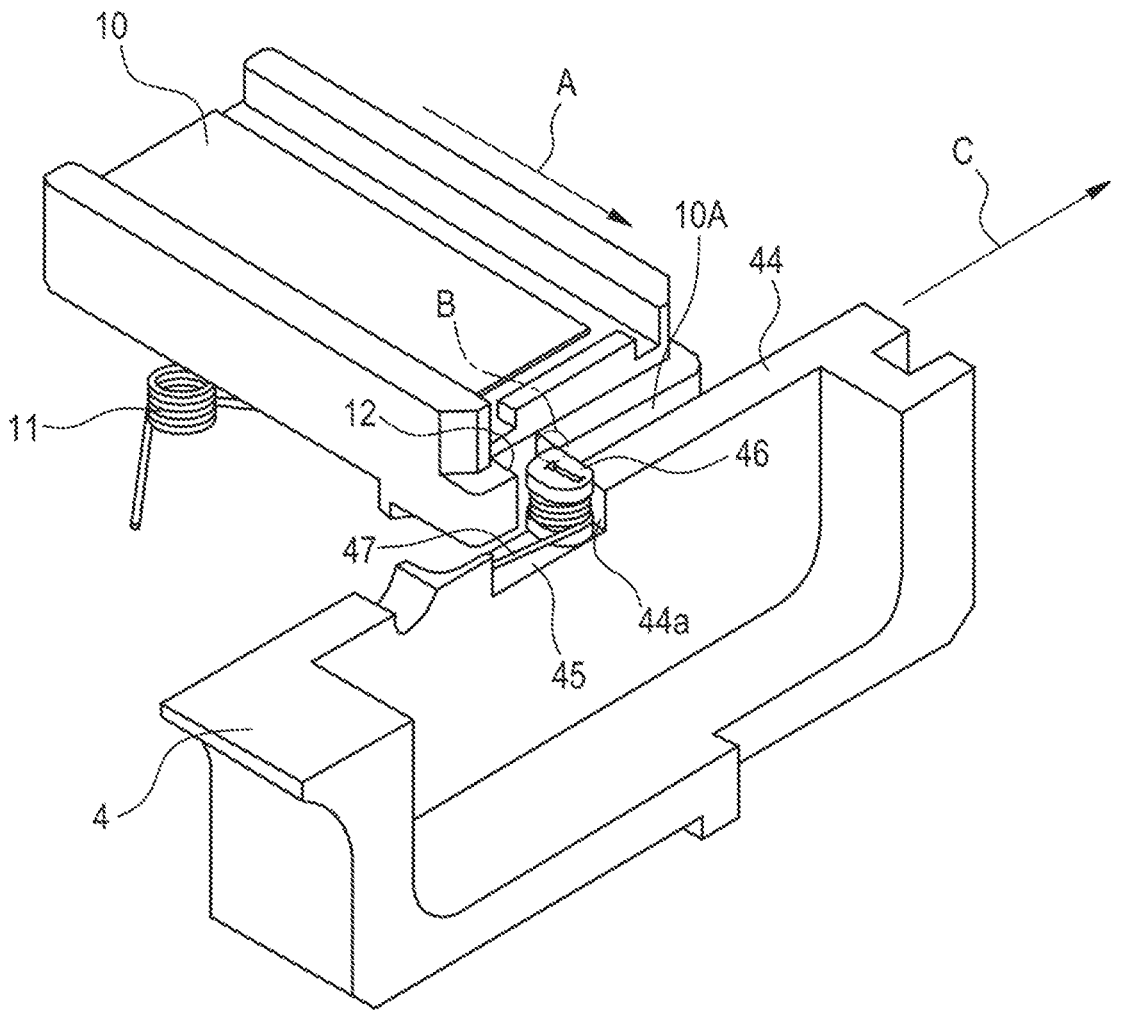

FIG. 4 is a view illustrating a positional relationship between the fiber fixing portion 10 and the moving portion 4. FIGS. 5 to 8 are partially enlarged views illustrating a vicinity of a cam 46 in each movement step of the moving portion 4. In FIG. 4, the left-right direction is a direction in which the fiber fixing portion 10 is movable, and the front-rear direction is a direction in which the moving portion 4 is movable.

As illustrated in FIG. 4, the fiber fixing portion 10 is provided with a biasing member 11 (an example of a first biasing member) configured to bias the fiber fixing portion 10 mounted in the guide concave portion 24 toward the moving portion 4 side (a direction indicated by an arrow A) to which the blade portion 41 is attached. In a state where the fiber fixing portion 10 is mounted in the guide concave portion 24, the fiber fixing portion 10 is constantly biased toward a direction of the moving portion 4 by the biasing member 11. The biasing member 11 is formed of, for example, a spring (torsion spring), a magnet, or the like. In FIG. 4, the biasing member 11 is provided below the fiber fixing portion 10. The biasing member 11 may be provided, for example, on a rear side or a lateral side of the fiber fixing portion 10.

A notch 12 is formed in a right end surface 10A that is a surface of the fiber fixing portion 10 on the moving portion 4 side. The notch 12 is formed in a size capable of receiving the cam 46 to be described later.

The moving portion 4 includes a concave portion 45 formed in the side wall 44 and the cam 46 provided to protrude upward from a bottom portion of the concave portion 45.

The cam 46 is rotatable counterclockwise (an example of a first direction) and clockwise (an example of a second direction) with an upper-lower direction as a rotation axis. However, the cam 46 is configured such that a range of rotation in a clockwise direction is limited. The cam 46 is configured to change, by rotating counterclockwise and clockwise, between a protruding state in which a part of the cam 46 protrudes from the concave portion 45 and protrudes to the fiber fixing portion 10 side from the side wall 44, and a non-protruding state in which the cam 46 does not protrude to the fiber fixing portion 10 side from the side wall 44.

A biasing member 47 (an example of a second biasing member) configured to bias the cam 46 to rotate the cam 46 about the rotation axis is attached to the cam 46. For example, the biasing member 47 is configured to bias the cam 46 such that the cam 46 rotates in a direction in which the cam 46 is in the protruding state. The biasing member 47 is provided in the concave portion 45 together with the cam 46. The biasing member 47 is formed of, for example, a torsion spring.

FIG. 4 illustrates the cam 46 in the protruding state. The cam 46 is provided at an end portion in the rearward direction in the concave portion 45 and at a position close to a rear inner wall surface 44a of the concave portion 45. Therefore, when the cam 46 is in the protruding state, the cam 46 comes into contact with the rear inner wall surface 44a of the concave portion 45 when the cam 46 is rotated clockwise, and the clockwise rotation is limited by the rear inner wall surface 44a such that the cam 46 cannot be further rotated.

In the present embodiment, the cam 46 is provided as a protruding member that protrudes upward from the bottom portion of the concave portion 45, and is rotatable about the upper-lower direction as the rotation axis, but the present disclosure is not limited to this. For example, a rod-shaped member whose posture can be changed between the protruding state and the non-protruding state by a biasing member may be used.

Hereinafter, a positional relationship between the cam 46 and the fiber fixing portion 10 in each moving step of the moving portion 4 will be described.

Figure 5:
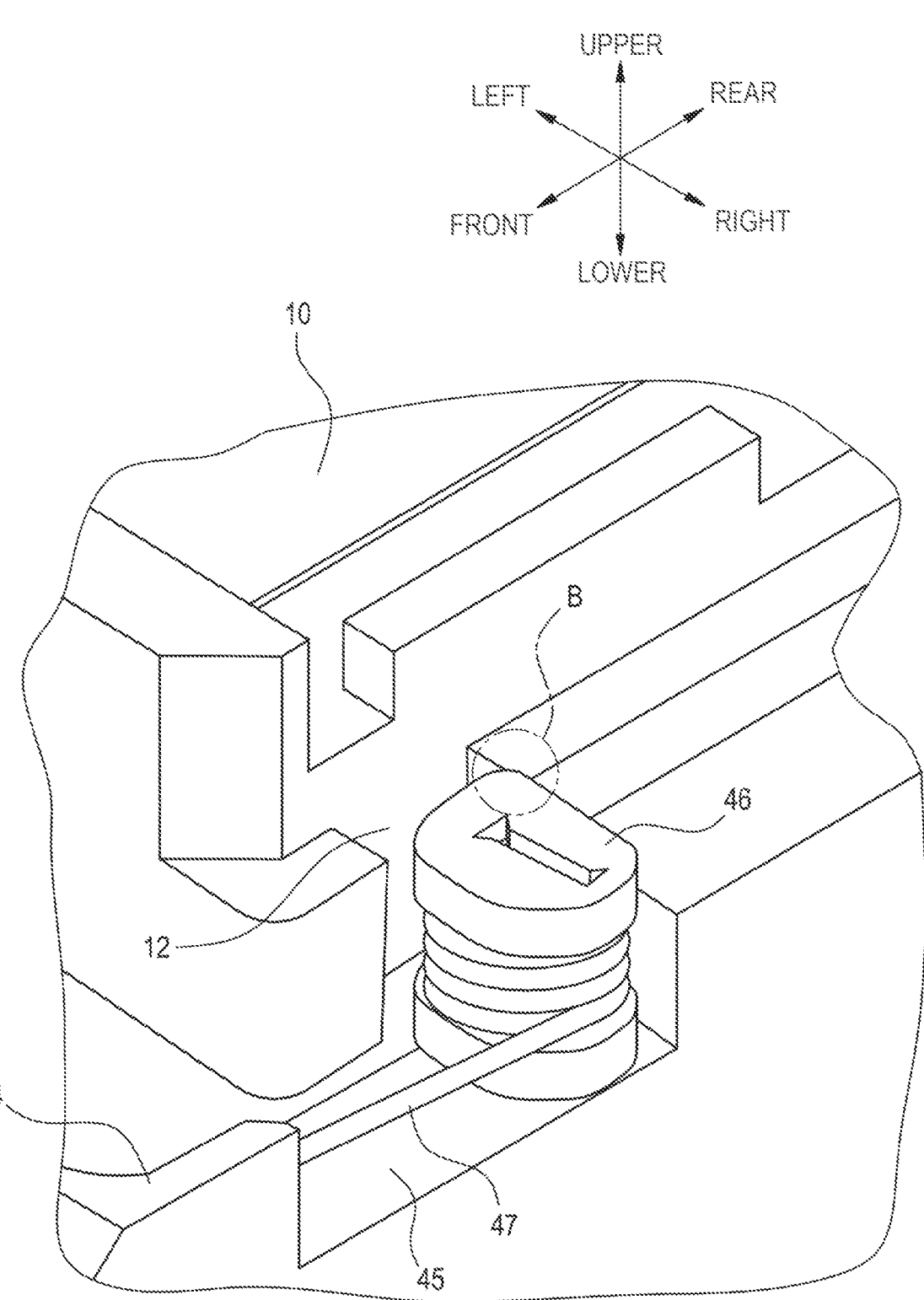
FIG. 5 is a view illustrating a step in which the moving portion is moving to a first position.

FIG. 5 is a view illustrating a step in which the moving portion 4 moves to the first position. FIG. 5 illustrates the same state as FIG. 4.

As illustrated in FIGS. 4 and 5, in a step where the moving portion 4 is moved to the first position, the cam 46 is rotated by the biasing force of the biasing member 47 to be in the protruding state. The fiber fixing portion 10 is biased by the biasing member 11 to move toward the moving portion 4 side. Further, the fiber fixing portion 10 and the moving portion 4 are provided such that a part of the moving portion 4 (cam 46) on the fiber fixing portion 10 side and a part of the fiber fixing portion 10 on the moving portion 4 side overlap in the left-right direction, when viewed from the front-rear direction. Specifically, a protruding portion of the cam 46 protruding toward the fiber fixing portion 10 side is received in the notch 12 formed on the moving portion 4 side of the fiber fixing portion 10. That is, as illustrated in a region B surrounded by a circle in FIGS. 4 and 5, the protruding portion of the cam 46 overlaps a part of the fiber fixing portion 10 on the moving portion 4 side in the left-right direction. Accordingly, in a state where the protruding portion of the cam 46 is accommodated in the notch 12, the biasing force of the fiber fixing portion 10 toward the direction of the moving portion 4 by the biasing member 11 is not inhibited by the cam 46.

Figure 6:
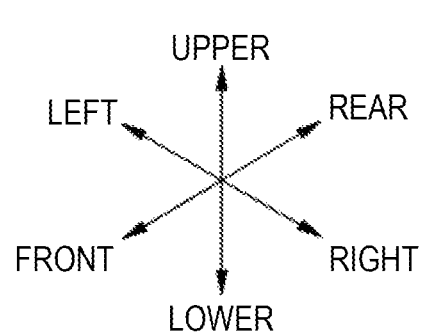
FIG. 6 is a view illustrating a step in the middle of movement of the moving portion from the first position to a second position.

FIG. 6 is a view illustrating a step in the middle of movement of the moving portion 4 from the first position to the second position, that is, a step in which the moving portion 4 is moving in the rearward direction (a direction of an arrow C).

As illustrated in FIG. 6, when the moving portion 4 is moved from the first position to the second position, the protruding portion of the cam 46 protruding toward the fiber fixing portion 10 side abuts against an inner wall surface 12A on the rear side of the notch 12 of the fiber fixing portion 10. Accordingly, the cam 46 is pressed in the forward direction by the fiber fixing portion 10. The cam 46 rotates counterclockwise (in a direction of an arrow D) against the biasing force of the biasing member 47 by the pressing from the fiber fixing portion 10. The cam 46 rotates counterclockwise to change the posture from the protruding state to the non-protruding state. On the other hand, the fiber fixing portion 10 maintains a state of being moved to the moving portion 4 side by being biased by the biasing member 11. That is, in the middle of the movement of the moving portion 4 from the first position to the second position, the cam 46 rotates counterclockwise not to inhibit the biasing member 11 from biasing the fiber fixing portion 10 toward the moving portion 4 side. Accordingly, the cam 46 is in the non-protruding state, and the fiber fixing portion 10 and the moving portion 4 are in a state where the fiber fixing portion 10 and the moving portion 4 do not overlap each other in the left-right direction, when viewed in the front-rear direction. As described above, in the middle of the movement of the moving portion 4 from the first position to the second position, a state where the right end surface 10A of the fiber fixing portion 10 and the cam 46 in the non-protruding state are in contact with each other is maintained.

Figure 7:
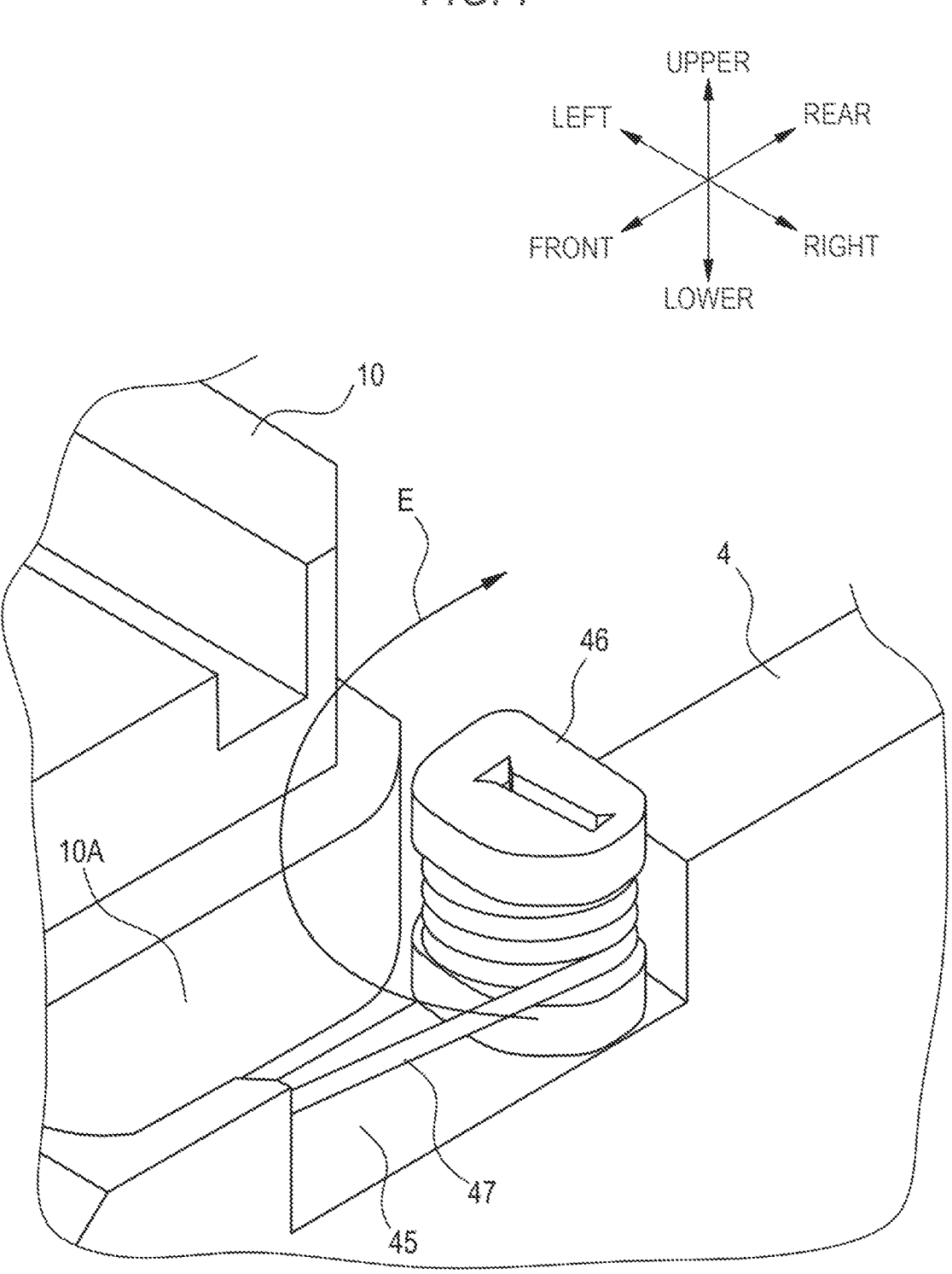
FIG. 7 is a view illustrating a step in which the moving portion reaches the second position.

FIG. 7 is a view illustrating a step in which the moving portion 4 reaches the second position, that is, a step in which the moving portion 4 moves in the rearmost direction.

As illustrated in FIG. 7, when the moving portion 4 reaches the second position, the cam 46 moves in the rearward direction from the fiber fixing portion 10 and does not come into contact with the right end surface 10A of the fiber fixing portion 10. Accordingly, the cam 46 rotates clockwise (in a direction of an arrow E) by the biasing force of the biasing member 47, and enters the same state as the protruding state illustrated in FIG. 5. That is, a part of the cam 46 protrudes toward the fiber fixing portion 10 side, and the fiber fixing portion 10 and the moving portion 4 overlap each other in the left-right direction, when viewed in the front-rear direction.

Figure 8:
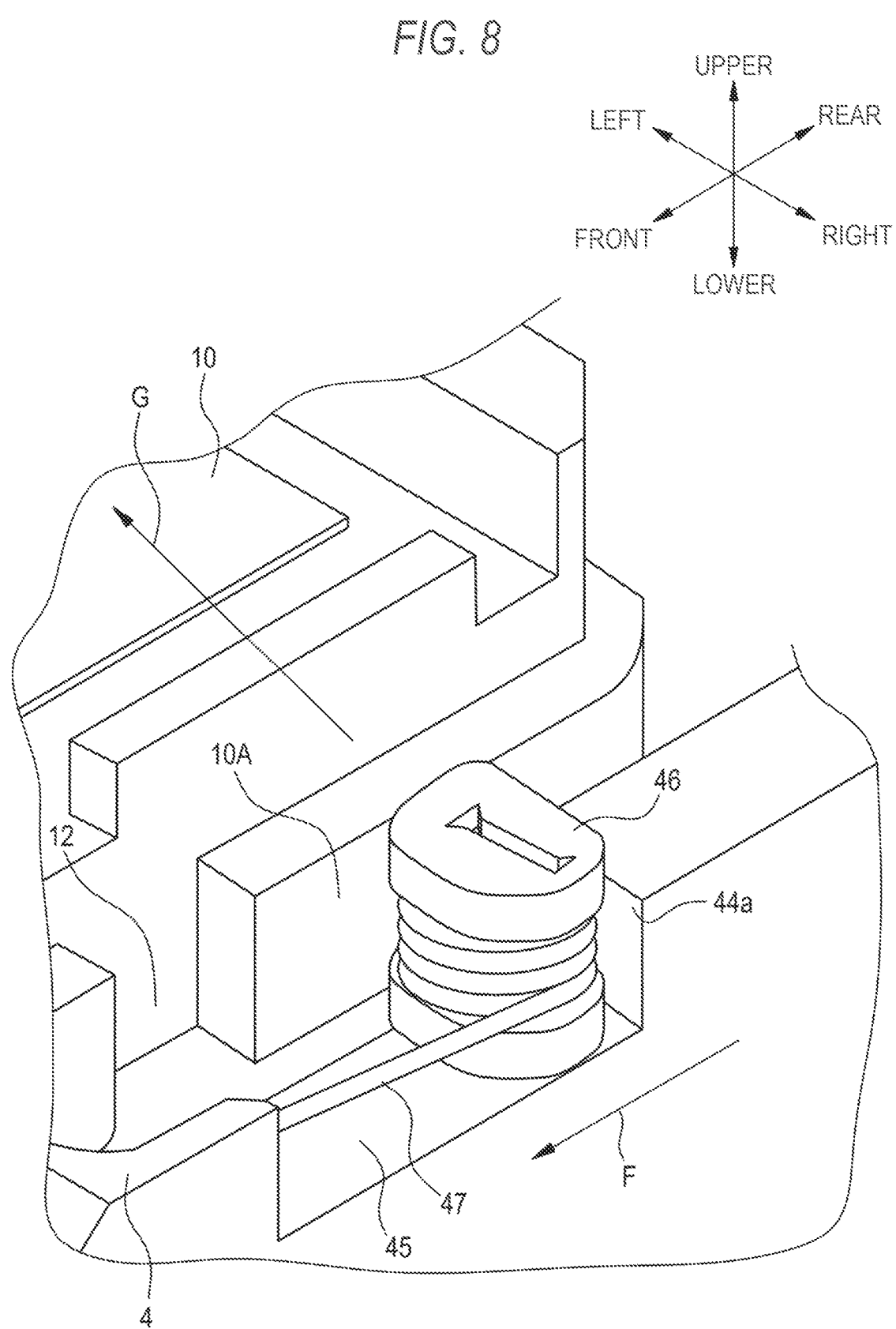
FIG. 8 is a view illustrating a step in the middle of the movement of the moving portion from the second position to the first position.

FIG. 8 is a view illustrating a step in the middle of the movement of the moving portion 4 from the second position to the first position, that is, a step in which the moving portion 4 is moving in the forward direction (a direction of an arrow F in FIG. 8).

As illustrated in FIG. 8, when the moving portion 4 is moved from the second position toward the first position, the protruding portion of the cam 46 protruding toward the fiber fixing portion 10 side abuts against the right end surface 10A of the fiber fixing portion 10, and the cam 46 is pressed in the rearward direction from the fiber fixing portion 10. However, since a range of clockwise rotation of the cam 46 is limited by the rear inner wall surface 44a of the concave portion 45, the cam 46 cannot further rotate clockwise. Therefore, the cam 46 maintains the protruding state while receiving the pressing in the rearward direction from the fiber fixing portion 10 and receiving the biasing force from the biasing member 47. This increases the pressing applied from the cam 46 to the fiber fixing portion 10. Then, the fiber fixing portion 10 moves in a direction (a direction of an arrow G in FIG. 8) away from the moving portion 4 (the blade portion 41) against the biasing force of the biasing member 11 by the pressing from the cam 46.

Next, the use procedure of the optical fiber cutter 1 and an operation of each portion will be described with reference to FIGS. 9A to 9D.

Figure 9A:
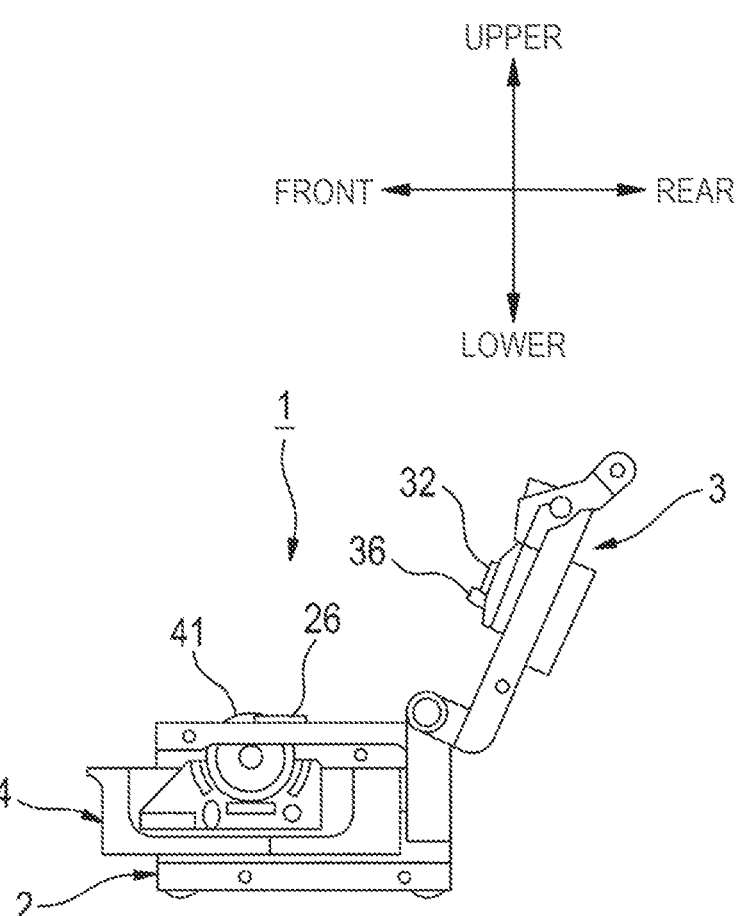
FIG. 9A is a view illustrating a use procedure of the optical fiber cutter and an operation of respective portions.

FIG. 9A illustrates a state in which the lid body 3 is opened and the moving portion 4 is at the first position. In this state, a user holds the optical fiber G to be cleaved in the optical fiber holder 100, mounts the optical fiber holder 100 to the fiber fixing portion 10, and determines the position of the optical fiber G. When the moving portion 4 is at the first position, the cam 46 of the moving portion 4 is rotated by the biasing force of the biasing member 47 to be in the protruding state (see FIG. 5). The fiber fixing portion 10 is biased by the biasing member 11 to move toward the moving portion 4 side. The protruding portion of the cam 46 in the protruding state is accommodated in the notch 12 of the fiber fixing portion 10.

Figure 9B:
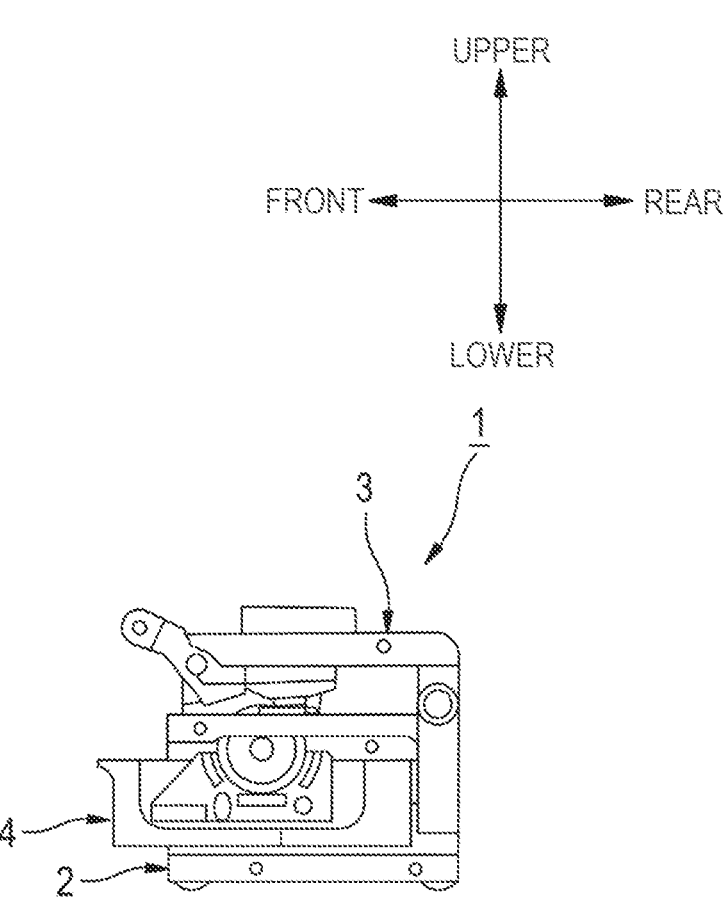
FIG. 9B is a view illustrating a use procedure of the optical fiber cutter and an operation of the respective portions.

FIG. 9B illustrates a state in which the lid body 3 is closed from the state of FIG. 9A. In the state of FIG. 9B, the moving portion 4 is still at the first position. In this state, the glass fiber portion of the optical fiber G is sandwiched and fixed between the upper clamp portion 32 and the lower clamp portion 26.

Figure 9C:
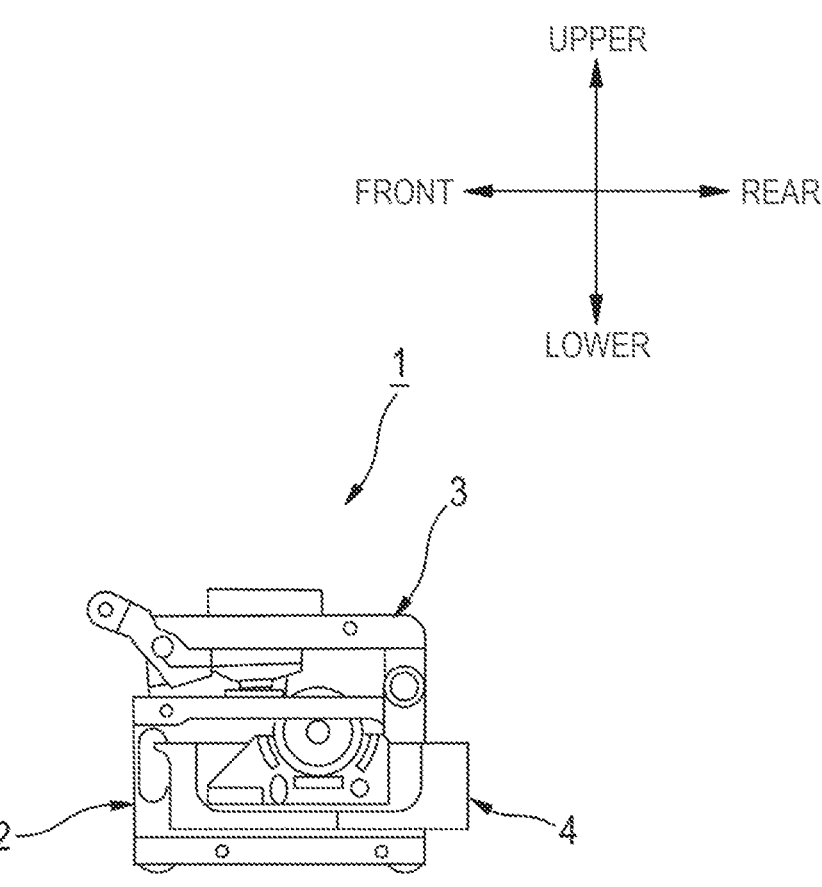
FIG. 9C is a view illustrating a use procedure of the optical fiber cutter and an operation of the respective portions.

FIG. 9C illustrates a state in which the user has moved the moving portion 4 to the second position from the state of FIG. 9B. In the middle of the movement of the moving portion 4 from the first position to the second position, the blade portion 41 attached to the moving portion 4 passes through the position of the optical fiber G sandwiched between the upper clamp portion 32 and the lower clamp portion 26, from the front to the rear. Accordingly, the glass fiber portion of the optical fiber G is initially scratched by the blade portion 41. In the middle of the movement of the moving portion 4 from the first position to the second position, the cam 46 is pressed in the forward direction from the fiber fixing portion 10, rotates counterclockwise, and enters the non-protruding state (see FIG. 6). In addition, the fiber fixing portion 10 maintains a state of being moved to the moving portion 4 side by the biasing force of the biasing member 11. When the moving portion 4 reaches the second position, the protrusion 42 (see FIG. 1) passes through the engaging piece 36, and the breaking member 35 protrudes by the biasing force of the compression spring to press the glass fiber portion of the optical fiber G. As a result, the optical fiber G is cleaved from the initial scratch of the glass fiber portion. When the moving portion 4 reaches the second position, the cam 46 moves further rearward than the fiber fixing portion 10, and the cam 46 rotates clockwise by the biasing force of the biasing member 47 and enters the protruding state (see FIG. 7). When the moving portion 4 moves to the second position, the movement of the moving portion 4 in the forward direction is restricted by the engagement between the protrusion 42 and the engaging piece 36.

Figure 9D:
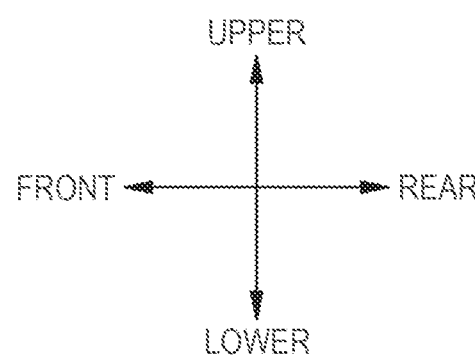
FIG. 9D is a view illustrating a use procedure of the optical fiber cutter and an operation of the respective portions.
Figure 9D:
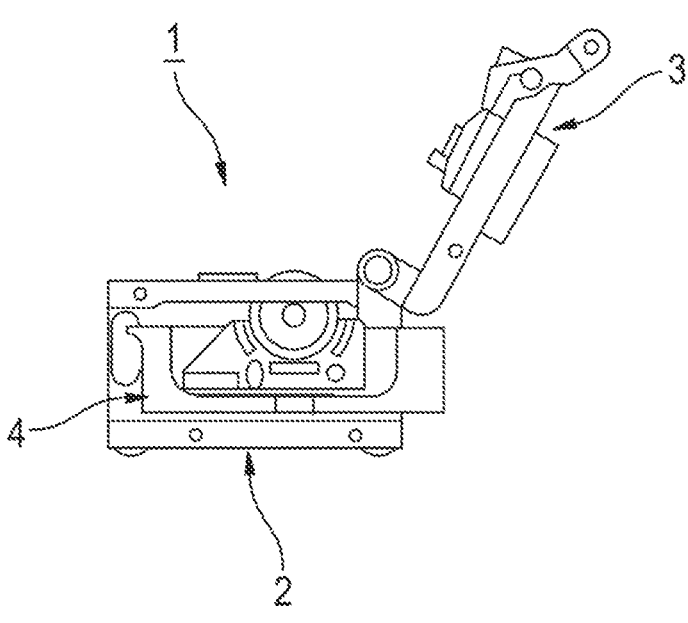

FIG. 9D illustrates a state in which the lid body 3 is opened from the state of FIG. 9C. When the lid body 3 is opened, the engagement between the protrusion 42 and the engaging piece 36 is released, and the moving portion 4 enters a state in which the moving portion 4 can move in the forward direction. Therefore, the moving portion 4 automatically starts moving in the forward direction by the action of the metal member 232, the first magnet 233, and the second magnet 43 illustrated in FIGS. 2 and 3. The glass fiber portion of the optical fiber G sandwiched between the upper clamp portion 32 and the lower clamp portion 26 is released from the fixation by the upper clamp portion 32 and the lower clamp portion 26. When the moving portion 4 starts moving in the forward direction, the cam 46 abuts against the fiber fixing portion 10 in the protruding state. However, since the clockwise rotation of the cam 46 is restricted by the rear inner wall surface 44a of the concave portion 45, the cam 46 maintains the protruding state without further clockwise rotation (see FIG. 8). On the other hand, the fiber fixing portion 10 is pressed by the cam 46 and moves in the direction away from the moving portion 4 (the blade portion 41) against the biasing force of the biasing member 11 (see FIG. 8). Accordingly, the cleaved optical fiber G moves in a direction away from the blade portion 41 together with the fiber fixing portion 10 while being held by the optical fiber holder 100. That is, the optical fiber G moves such that the cleaved surface after cleaving is positioned in the direction away from the blade portion 41 along the axial direction of the optical fiber G.

Thereafter, the moving portion 4 automatically moves to the first position and returns to the state illustrated in FIG. 9A. In the middle of the movement of the moving portion 4 from the second position to the first position, since the cleaved surface of the optical fiber G is positioned in the direction away from the blade portion 41 along the axial direction of the optical fiber G, the blade portion 41 does not abut on the optical fiber G. That is, the optical fiber G does not cross a movement range when the blade portion 41 moves from the second position toward the first position.

When the moving portion 4 returns to the first position, which is the state illustrated in FIG. 9A, the protruding portion of the cam 46 is accommodated again in the notch 12 of the fiber fixing portion 10. Accordingly, the fiber fixing portion 10 moves toward the moving portion 4 side by the biasing force of the biasing member 11 (see FIGS. 4 and 5). In the state of FIG. 9A in which the moving portion 4 has returned to the first position, the upper portion of the blade portion 41 is positioned on the front side of the lower clamp portion 26. Therefore, even when the optical fiber holder 100 holding the optical fiber G in this state is still mounted to the fiber fixing portion 10, the optical fiber G does not come into contact with the blade portion 41.

As described above, the optical fiber cutter 1 according to the present embodiment is a cutter for cleaving the optical fiber G, and includes the main body 2 including the fiber fixing portion 10 capable of changing the position of the optical fiber G, and the moving portion 4 including the blade portion 41 for scratching the optical fiber G and attached to the main body 2 to be movable between the first position that is the initial position before the optical fiber G is scratched by the blade portion 41 and the second position that is the position after the optical fiber G is scratched by the blade portion 41. Further, the fiber fixing portion 10 moves the optical fiber G such that the optical fiber G fixed to the fiber fixing portion 10 does not cross the movement range when the blade portion 41 moves from the second position to the first position and the cleaved surface of the optical fiber G after cleaving is positioned in the direction away from the blade portion 41 along the axial direction of the optical fiber G. According to this configuration, when the moving portion 4 returns from the second position to the first position, the fiber fixing portion 10 fixing the optical fiber G can move the cleaved optical fiber G away from the blade portion 41. Accordingly, it is possible to prevent the blade portion 41 from unintentionally coming into contact with and scratching the optical fiber G after the optical fiber G is cleaved.

The optical fiber cutter 1 further includes the biasing member 11 configured to bias the fiber fixing portion 10 toward the blade portion 41 side. The fiber fixing portion 10 is biased by the biasing member 11 to be positioned on the blade portion 41 side, when the moving portion 4 moves from the first position to the second position, and the fiber fixing portion 10 moves in a direction away from the blade portion 41 against the biasing force of the biasing member 11, when the moving portion 4 moves from the second position to the first position. According to this configuration, the position of the fiber fixing portion 10 can be changed with a simple configuration using the biasing force of the biasing member 11, and it is possible to reliably prevent the blade portion 41 from unintentionally coming into contact with and scratching the optical fiber G after the optical fiber G is cleaved.

According to the optical fiber cutter 1, the moving portion 4 includes the rotatable cam 46 and the biasing member 47 that biases the cam 46 such that the cam 46 rotates in the direction in which the cam 46 protrudes toward the fiber fixing portion 10 side. Further, the cam 46 rotates in a direction in which the cam 46 does not protrude toward the fiber fixing portion 10 side against the biasing force of the biasing member 47, when the moving portion 4 moves from the first position to the second position, and the cam 46 protrudes toward the fiber fixing portion 10 side by being biased by the biasing member 47, when the moving portion 4 moves from the second position to the first position. Therefore, the position of the fiber fixing portion 10 can be changed at an appropriate timing, when the moving portion 4 moves between the first position and the second position based on the change between the protruding state of the cam 46 and the non-protruding state thereof caused by the rotation of the cam 46 mounted on the moving portion 4.

According to the optical fiber cutter 1, the cam 46 is rotatable in the first direction and the second direction opposite to the first direction, and the range of rotation in the second direction is limited. When the moving portion 4 moves from the first position to the second position, the cam 46 rotates in the first direction so as not to inhibit the biasing member 11 from biasing the fiber fixing portion 10 toward the blade portion 41 side. Further, when the moving portion 4 reaches the second position, the cam 46 receives the biasing force of the biasing member 47 and rotates in the second direction in which the cam 46 protrudes toward the fiber fixing portion 10 side since the cam 46 is not in contact with the fiber fixing portion 10. Further, when the moving portion 4 moves from the second position to the first position, the cam 46 presses the fiber fixing portion 10 by limiting the range of rotation in the second direction and maintaining the protruding toward the fiber fixing portion 10 side. Accordingly, the cam 46 moves the fiber fixing portion 10 in a direction away from the blade portion 41 against the biasing force of the biasing member 11. In this way, by limiting the range of rotation of the cam 46 in a specific direction (second direction), when the moving portion 4 moves from the second position to the first position, the fiber fixing portion 10 can be reliably retreated.

According to the optical fiber cutter 1, the cam 46 and the biasing member 47 are mounted in the concave portion 45 formed in the moving portion 4. When the moving portion 4 moves from the second position to the first position, the cam 46 comes into contact with the rear inner wall surface 44a of the concave portion 45, thereby limiting the rotation of the cam 46 in the second direction. Therefore, the configuration in which the range of rotation of the cam 46 in the second direction is limited and the optical fiber G is retracted together with the fiber fixing portion 10 by the protrusion of the cam 46 can be realized with a simple and small number of components.

Although the present disclosure has been described in detail with reference to a specific embodiment, it is apparent to those skilled in the art that various changes and modifications can be made without departing from the spirit and scope of the present disclosure. In addition, the number, positions, shapes, and the like of the constituent members described above are not limited to the embodiment described above, and can be changed to the number, positions, shapes, and the like suitable for carrying out the present disclosure.

In the above embodiment, the configuration in which the moving portion 4 is automatically returned to the first position that is the initial position after the optical fiber G is cleaved is adopted, but the present invention is not limited to this example. The configurations of the fiber fixing portion 10 and the cam 46 according to the present embodiment can also be adopted in an optical fiber cutter configured to manually return the moving portion 4 to the first position after the optical fiber G is cleaved. Also in this case, when the moving portion 4 is manually returned to the first position after the optical fiber G is cleaved, it is possible to prevent the blade portion 41 from unintentionally coming into contact with and scratching the optical fiber G.

REFERENCE SIGNS LIST

1: optical fiber cutter
2: main body
3: lid body
4: moving portion
10: fiber fixing portion
11: biasing member (example of first biasing member)
21: top plate portion
22: bottom plate portion
23: connection portion
24: guide concave portion
25: exposure hole
26: lower clamp portion
27: catcher
31: support shaft
32: upper clamp portion

33: magnet
34: handle
35: breaking member
36: engaging piece
41: blade portion
42: protrusion
43: second magnet
44: side wall
44a: rear inner wall surface
45: concave portion
46: cam
47: biasing member (example of second biasing member)
100: optical fiber holder
231: guide portion
232: metal member
233: first magnet
G: optical fiber

What is claimed is:

1. An optical fiber cutter for cleaving an optical fiber, the optical fiber cutter comprising:
   a main body including a fiber fixing portion, the fiber fixing portion configured to change a position of the optical fiber;
   a moving portion including a blade for scratching the optical fiber, the moving portion being attached to the main body to be movable between a first position and a second position, the first position being an initial position before the optical fiber is scratched, the second position being a position after the optical fiber is scratched; and
   a first biasing member configured to bias the fiber fixing portion toward the blade,
   wherein when the moving portion moves from the first position to the second position, the fiber fixing portion is biased by the first biasing member to be positioned on the blade, and
   when the moving portion moves from the second position to the first position, the fiber fixing portion moves in a direction away from the blade against a biasing force of the first biasing member,
   wherein the moving portion includes:
      a rotatable cam; and
      a second biasing member configured to bias the cam such that the cam rotates in a direction in which the cam protrudes toward the fiber fixing portion, and
   wherein when the moving portion moves from the first position to the second position, the cam rotates in a direction in which the cam does not protrude toward the fiber fixing portion against a biasing force of the second biasing member, and
   when the moving portion moves from the second position to the first position, the cam protrudes toward the fiber fixing portion by being biased by the second biasing member.

2. The optical fiber cutter according to claim 1,
   wherein the cam is rotatable in the direction in which the cam does not protrude toward the fiber fixing portion and in the direction in which the cam protrudes toward the fiber fixing portion, and a range of rotation of the cam in the direction in which the cam protrudes toward the fiber fixing portion is limited,
   wherein when the moving portion moves from the first position to the second position, the cam rotates in the direction in which the cam does not protrude toward the fiber fixing portion not to inhibit the first biasing member from biasing the fiber fixing portion toward the blade, wherein when the moving portion reaches the second position, the cam is not in contact with the fiber fixing portion, and the cam receives the biasing force of the second biasing member and rotates in the direction in which the cam protrudes toward the fiber fixing portion in which the cam protrudes toward the fiber fixing portion, and wherein when the moving portion moves from the second position to the first position, the cam presses the fiber fixing portion by limiting the range of the rotation of the cam in the direction in which the cam protrudes toward the fiber fixing portion and maintaining protruding of the cam toward the fiber fixing portion, and the fiber fixing portion moves in the direction away from the blade against the biasing force of the first biasing member.

3. The optical fiber cutter according to claim 2, wherein the cam and the second biasing member are mounted in a concave portion formed in the moving portion, and wherein when the moving portion moves from the second position to the first position, the cam comes into contact with an inner wall surface of the concave portion, and the rotation of the cam in the direction in which the cam protrudes toward the fiber fixing portion is limited.

* * * * *